United States Patent
Aoki et al.

(10) Patent No.: US 7,532,886 B2
(45) Date of Patent: *May 12, 2009

(54) MOBILE RADIO COMMUNICATION APPARATUS FOR SELECTING A HIGH PRIORITY SYSTEM AT THE TIME OF TURNING POWER ON

(75) Inventors: Ippo Aoki, Fuchu (JP); Akira Ishikura, Kawasaki (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 602 days.

This patent is subject to a terminal disclaimer.

(21) Appl. No.: 11/218,485

(22) Filed: Sep. 6, 2005

(65) Prior Publication Data

US 2006/0052102 A1 Mar. 9, 2006

Related U.S. Application Data

(62) Division of application No. 09/893,446, filed on Jun. 29, 2001, now Pat. No. 7,027,831.

(30) Foreign Application Priority Data

Jun. 30, 2000 (JP) ............................. 2000-197576

(51) Int. Cl.
*H04W 4/00* (2009.01)

(52) U.S. Cl. .................. 455/435.3; 455/434; 455/435.1; 455/512; 455/513; 455/514

(58) Field of Classification Search ........................ None
See application file for complete search history.

(56) References Cited

U.S. PATENT DOCUMENTS

| 5,586,338 | A | 12/1996 | Lynch et al. |
| 5,870,674 | A | 2/1999 | English |
| 6,223,042 | B1 | 4/2001 | Raffel |
| 6,259,917 | B1 | 7/2001 | Elzein |
| 6,311,064 | B1 | 10/2001 | Bamburak et al. |
| 6,415,148 | B1 | 7/2002 | Chiniga et al. |
| 6,466,802 | B1 | 10/2002 | Blakeney et al. |
| 6,625,451 | B1 | 9/2003 | La Medica et al. |
| 6,782,259 | B2 * | 8/2004 | Bamburak et al. .......... 455/434 |
| 7,027,831 | B2 * | 4/2006 | Aoki et al. .................. 455/525 |
| 7,096,015 | B2 * | 8/2006 | Bridges et al. ........... 455/432.1 |

(Continued)

*Primary Examiner*—Charles N Appiah
*Assistant Examiner*—Willie J Daniel, Jr.
(74) *Attorney, Agent, or Firm*—Oblon, Spivak, McClelland, Maier & Neustadt, P.C.

(57) ABSTRACT

Disclosed herein is a mobile radio communication apparatus, wherein priority data items representing the priorities of base stations are stored. The SID of the base station seized when the apparatus was turned off last is stored in the apparatus, too. When the apparatus is turned on, it may identify a base station of higher priority than the base station it seized when it was turned off. In this case, the apparatus seizes the base station of higher priority and goes into an idle state. Thus, the apparatus that can seize a base station of high priority even if it seized a base station of low priority when it was turned off last and if it now exits in an area formed by the overlapping of the two service areas in which the low-priority base station and the high-priority base station operate, respectively.

14 Claims, 7 Drawing Sheets

U.S. PATENT DOCUMENTS

2001/0053689 A1 12/2001 Aoki et al.
2002/0052189 A1 5/2002 Aoki et al.
2003/0186695 A1 10/2003 Bridges et al.

* cited by examiner

| Acquisition table ||
| Acquisition Index | Scan range |
|---|---|
| 0 | Digital A type (CH=283, 691) |
| 1 | Digital B type (CH=384, 777) |
| 2 | Analog A type (CH=333-313) |
| 3 | Analog B type (CH=333-354) |

FIG. 3

| System table ||||
| GEO | SID | Priority | Acquisition Index |
|---|---|---|---|
| 1 | 54 | 1 | 1 |
| | 41 | 2 | 0 |
| | 4002 | 3 | 3 |
| 2 | 189 | 1 | 0 |
| | 85 | 2 | 0 |
| | 121 | 3 | 0 |

(12) United States Patent

MOBILE RADIO COMMUNICATION APPARATUS FOR SELECTING A HIGH PRIORITY SYSTEM AT THE TIME OF TURNING POWER ON

CROSS-REFERENCE TO RELATED APPLICATIONS

This application is a divisional of U.S. patent application Ser. No. 09/893,446, filed Jun. 29, 2001, which is based upon and claims the benefit of priority from the prior Japanese Patent Application No. 2000-197576, filed Jun. 30, 2000, the entire contents of each of which are incorporated herein by reference.

BACKGROUND OF THE INVENTION

1. Field of the Invention

The present invention relates to a mobile radio communication apparatus that performs a control process to seize a base station. More particularly, it relates to a mobile radio communication apparatus that can seize one of the base stations in the descending order of priority assigned to the base stations.

2. Description of the Related Art

Every mobile radio communication system comprises base stations, mobile radio communication apparatuses, each mobile apparatus connected to one of the base stations over a radio channel. In a mobile radio communication system, any mobile radio communication apparatus starts a control process when its power switch is turned on. Upon finishing the control process, the apparatus seizes the base station and takes an idle state. In the idle state, the apparatus receives a call from the base station seized. While remaining in the idle state, the apparatus can transmit the user's calls origination to the base station.

Generally, the areas covered by base stations overlap one another, and the base stations offer same service at different charges. The mobile radio communication apparatus stores information representing a priority corresponding to each base station. Priority is allocated to each base station in accordance with the charge at which they provide the service. More precisely, the lower the charge, the higher the priority. Thus, the apparatus tries to seize, first the base station whose charge is the lowest, next the base station whose charge is the second lowest, and so forth.

The apparatus is designed on the assumption that the user turns off the apparatus in the idle state and turn it on again, in most cases in the same place. Thus, when the apparatus is turned on again, it immediately seizes the same base station it seized last, saving time for the control process. Thus, the mobile radio communication apparatus can save the battery power, in the following specific method.

The apparatus incorporates an MRU (Most Recent Used) memory. The MRU memory stores the data representing a system ID number and a frequency that corresponds to the system ID number (SID) of the base station seized when the apparatus was turned off last. When the apparatus is turned on, the MRU memory is searched for the SID based on the stored frequency and the stored SID. If the SID is detected, the apparatus seizes the base station having this SID and takes an idle state. Thus, the apparatus need not examine the priority allocated to the base station which is stored in the apparatus in order to seize the base station again. This helps to shorten the time the apparatus may spend to take an idle state.

However, this method is disadvantageous in the following respect.

Figure 11:
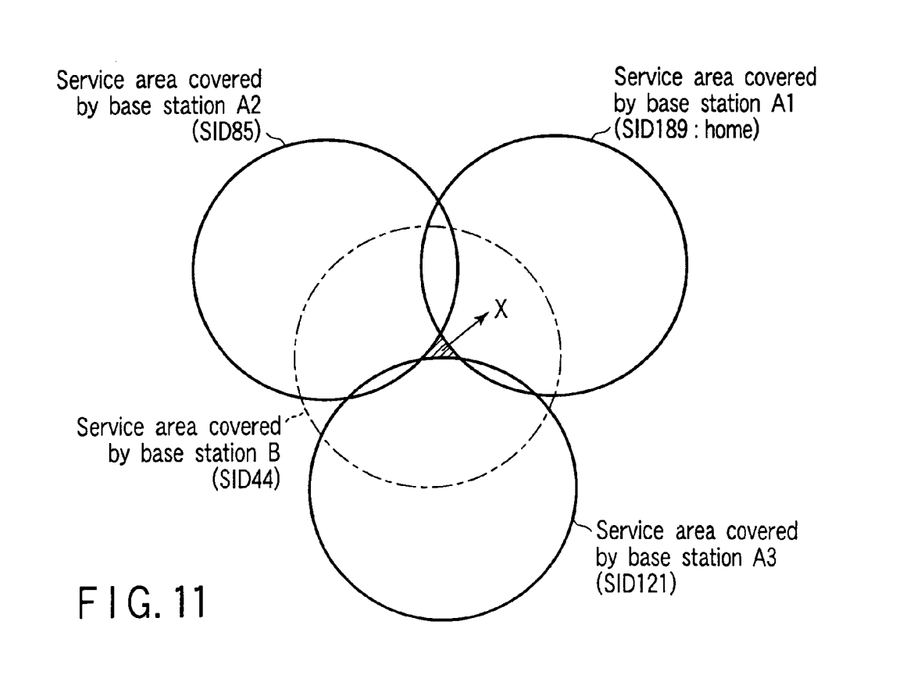
FIG. 11 is a diagram illustrating a mobile communication system incorporating the first embodiment of the invention, in which base stations cover service areas that overlap one another.

Assume that four base stations A1, A2, A3 and B are operating in the mobile communication system in which the mobile radio communication apparatus is used, as is illustrated in FIG. 11. The base stations A1, A2, A3 and B cover four service areas, which overlap one another as shown in FIG. 11. Suppose an order of the priority that the user of the apparatus wants to seize is the base station A1, base station A2, base station A3 and base station B. That is, the base station B which covers the area indicated by a broken circle has the lowest priority.

The apparatus may exist in a shaded part of the service area of the base station B, which does not overlap the service areas of the other base stations A1 to A3. In this case, the apparatus cannot seize the base stations A1, A2 or A3 having priority higher than that of the base station B. This is because no radio signals broadcast from the base stations A1 to A3 reach the apparatus. Thus, the apparatus seizes the base station B and takes the idle state. When the apparatus goes into the idle state, the SID44 assigned to the base station B is stored into the MRU memory. Thereafter, the user may turned off the apparatus and move to a position X, bringing the apparatus with the user. The position X lies in both the service area of the base station B and that of the base station A1. Hence, the apparatus can now seize the base station A1 that has higher priority than the base station B, as the user desires. Nonetheless, the conventional apparatus seizes the base station B based on SID44 stored in the MRU memory when the user turns on the apparatus.

As described above, when the conventional mobile radio communication apparatus is turned off, the SID number of the base station had been stored into the MRU memory. When the apparatus is turned on thereafter, it refers to the stored SID number, even if it has been moved to a position in both the service area of that base station and the service area of any other base station having high priority and the position being therefore more desirable for the user obviously, this is inconvenient to the user who wishes to receive service at the lowest possible charge, for example.

BRIEF SUMMARY OF THE INVENTION

The present invention has been made in view of the foregoing. An object of the invention is to provide a mobile radio communication apparatus that can seize a base station having higher priority than any other base station, after it is moved into an area formed by the overlapping of two or more services areas of the base stations having different priorities, even if the base station seized when it was turned off last has lower priority.

According to a first aspect of the invention, there is provided a mobile radio communication apparatus for use in a mobile radio communication system which includes base stations, mobile radio communication apparatuses to be connected to the base stations over radio channels, and in which each of the base stations broadcasts a system ID number for identifying the base station, the apparatus comprising:

first memory means for storing system ID numbers and priority data items, each item associated with each of the system ID numbers and representing priority assigned to each base station, so as to be used to seize one base station;

seizing means for receiving the broadcast system ID number in accordance with the priority data item stored in the first memory means, for seizing the base station having the system ID number received, and for setting the apparatus in an idle state;

second memory means for storing the system ID number of the seized base station when a user operates the apparatus and inputs a turn-off instruction for turning off the apparatus, while the apparatus remaining in the idle state; and control means for turning off the apparatus in response to the turn-off instruction, for determining whether the apparatus receives a system ID number of higher priority than the system ID number stored in the second memory means, in response to the turn-on instruction and by referring to the contents of the first memory means, and for seizing the base station having the system ID number of higher priority and setting the apparatus in the idle state when the apparatus receives the system ID number of higher priority.

According to a second aspect of the invention, there is provided a mobile radio communication apparatus for use in a mobile radio communication system which includes base stations, mobile radio communication apparatuses to be connected to the base stations over radio channels, and in which each of the base stations broadcasts a system ID numbers for identifying the base station, the apparatus comprising:

first memory means for storing system ID numbers and priority data items, each item associated with each of the system ID numbers and representing priority assigned to each base station, so as to be used to seize one base station;

first seizing means for receiving the broadcast system ID number in accordance with the priority data item stored in the first memory means, for seizing the base station having the system ID number received, and for setting the apparatus in an idle state;

second memory means for storing the system ID number of the seized base station when a user operates the apparatus and inputs a turn-off instruction for turning off the apparatus, while the apparatus remaining in the idle state;

second seizing means for seizing the base station having the system ID number stored in the second memory means and setting the apparatus in an idle state when the apparatus is turned on; and control means for determining whether the apparatus receives a system ID number of higher priority than the system ID number of the base station seized by the second seizing means, by referring to the contents of the first memory means, and for seizing the base station having the system ID number of higher priority and setting the apparatus in the idle state when the apparatus receives the system ID number of higher priority.

According to a third aspect of the invention, there is provided a mobile radio communication apparatus for use in a mobile radio communication system which includes base stations, mobile radio communication apparatuses to be connected to the base stations over radio channels, and in which each of the base stations broadcasts a system ID number for identifying the base station, the apparatus comprising:

first memory means for storing system ID numbers, priority data items, each item associated with each of the system ID numbers and representing priority assigned to each base station, so as to be used to seize one base station;

seizing means for receiving the broadcast system ID number in accordance with the priority data item stored in the first memory means, for seizing the base station having the system ID number received, and for setting the apparatus in an idle state;

second memory means for storing the system ID number of the seized base station if the system ID number of the seized base station is included in the first memory means in accordance with turn-off operation during the idle state; and control means for turning off the apparatus in response to the turn-off instruction and for seizing the base station having the system ID number stored in the second memory means and setting the apparatus in the idle state when the user operates the apparatus and inputs a turn-on instruction for turning on the apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

FIRST EMBODIMENT

Figure 1:
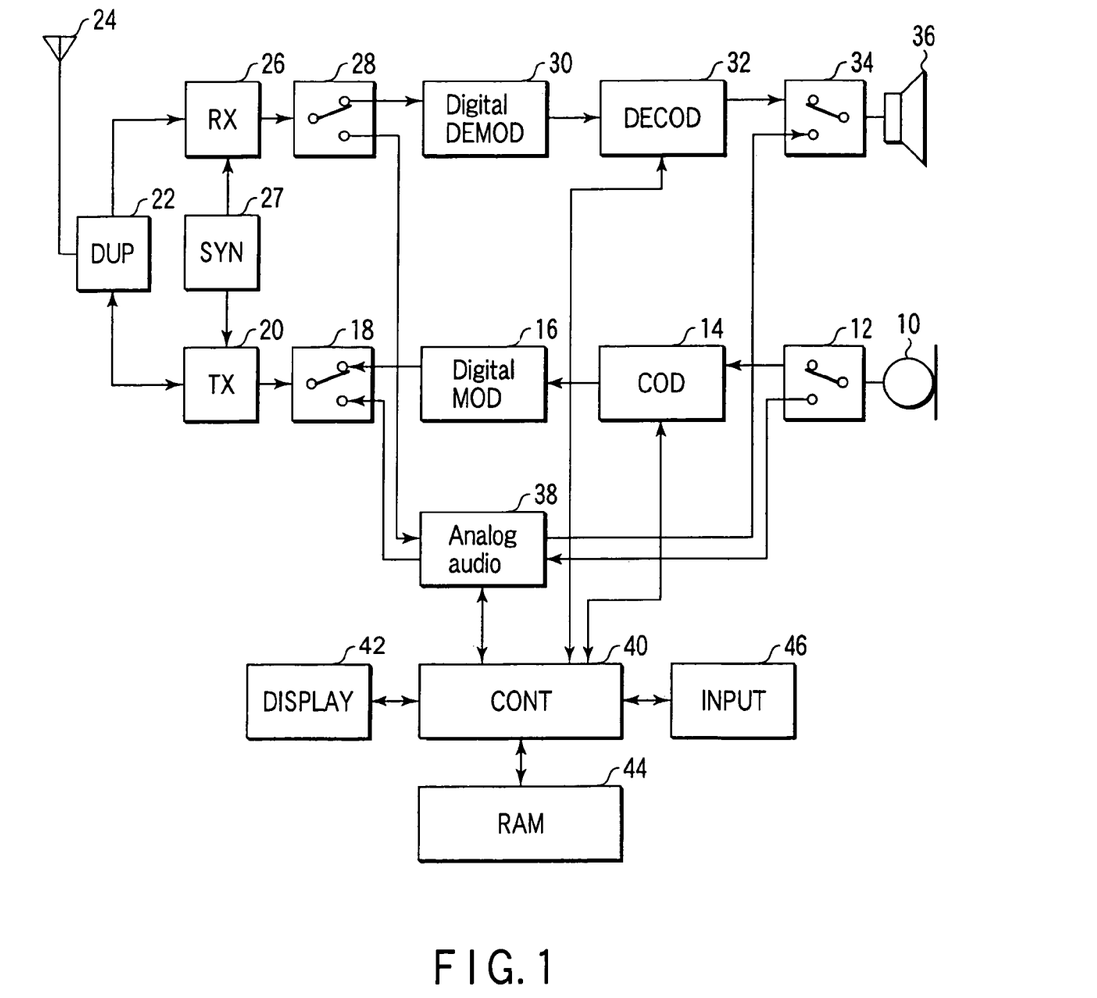
FIG. 1 is a block diagram of a mobile radio communication apparatus that is a first embodiment of the invention.

An embodiment of the present invention will be described. The first embodiment is a mobile radio apparatus having the structure shown in FIG. 1. As shown in FIG. 1, the apparatus comprises a microphone 10, a switch 12, an encoder 14, a digital modulator 16, a switch 18, a radio transmitter 20, a duplexer 22, and an antenna 24, a radio receiver 26, and a synthesizer 27, a switch 28, a digital demodulator 30, a decoder 32, a switch 34, and a speaker 36.

An audio signal from the microphone 10 is supplied via the switch 12 to the encoder 14. The encoder 14 converts the audio signal to a digital signal. The digital signal is compressed and supplied to the digital modulator 16. The digital modulator 16 modulates the compressed digital signal. The modulated digital signal is supplied via the switch 18 to the radio transmitter 20. The radio transmitter 20 converts the modulated digital signal to a high-frequency signal in accordance with a local signal output from the synthesizer 27. The high-frequency signal is amplified to a prescribed power level. The signal thus amplified is supplied to the duplexer 22 and thence to the antenna 24 only. The antenna 24 transmits the amplified signal.

The antenna 24 may receive a high-frequency radio signal transmitted from a base station. The high-frequency radio signal is supplied to the duplexer 22 and then to the radio receiver 26 only. The radio receiver 26 amplifies the received signal and converts the amplified received signal to a baseband (low-frequency) signal in accordance with a local signal supplied from the synthesizer 27. The base-band signal is supplied via the switch 28 to the digital demodulator 30. The digital demodulator 30 performs digital demodulation on the base-band signal.

The demodulated signal output from the digital demodulator 30 is supplied to the decoder 32. The decoder 32 decompresses the baseband signal and converts the decompressed signal to an analog signal. The analog signal is input, through the switch 34, to the speaker 36. The speaker 36 generates speech sound from the analog signal.

All signal-processing steps described above are carried out when the radio communication is effected in digital mode. How signals are processed when the radio communication is performed in analog mode will be described below.

As shown in FIG. 1, the mobile radio communication apparatus further comprises an analog audio circuit 38, a controller 40, a display 42, a memory (RAM) 44, and an input operation unit 46. In the analog communication mode, the movable contact in the switches 12, 18, 28 and 34 is disconnected from the upper stationary contact to the lower stationary contact, in accordance with instructions given by the controller 40. Now that the movable contact is connected to the lower stationary contact in the switches 12, 18, 28 and 34, the analog signal output from the microphone 10 is input via the switch 12 to the analog audio circuit 38. The analog audio circuit 38 modulates the analog signal. The modulated signal is supplied via the switch 18 to the radio transmitter 20. The radio transmitter 20 converts the analog modulated signal to a high-frequency signal. The high-frequency signal is supplied via the duplexer 22 to the antenna 24. The antenna 24 transmits the high-frequency signal.

In the analog communication mode, a radio signal transmitted from a base station is supplied from the antenna 24 via the duplexer 22 to the radio receiver 26. The radio receiver 26 converts the received radio signal, to a baseband signal. The baseband signal is supplied to the analog audio circuit 38. The circuit 38 demodulates the baseband signal to an analog demodulated signal, which is output via the switch 34 to the speaker 36. The speaker 36 generates speech sound from the analog demodulated signal.

As shown in FIG. 1, the display 42, RAM 44 and input operation unit 46 are connected to the controller 40. To perform telecommunication, the user may operate the unit 46, thus inputting data. The display 42 displays the data thus input. Alternatively, the user may use the display 42 and the input operation unit 46 to input character data when the user utilizes the short-message service (SMS).

The mobile radio communication system that incorporates the apparatus of FIG. 1 will be described with reference to FIG. 11, to facilitate the understanding of the operation of the apparatus.

As shown in FIG. 11, the mobile radio communication system comprises four base stations A1, A2, A3 and B that have constructed in a geographical area (GEO). Four systems ID numbers (SIDs) are assigned to the four base stations, each identifying one base station. The four service areas overlap one another as is illustrated in FIG. 11. More specifically, SID189 is assigned to the base station A1. Suppose the user of the apparatus has entered a contract with this base station A1. Then, the base station A1 is the home base station to the mobile radio communication apparatus. Note that SID85, SID121 and SID44 are assigned to the base stations A2, A3 and B, respectively.

How the controller 40 operates to bring the apparatus into the idle state will be explained.

The RAM 44 stores the ID number (SID) and frequency (f) assigned to a base station to which the apparatus was connected when the power switch on the apparatus was closed last. More precisely, the SID and f are stored into the MRU (Most Recently Used) region of the RAM 44.

The RAM 44 also stores the ID number SIDH that was assigned to home base station and included in a carrier with which the user entered a contract. Whenever the apparatus is connected to the home base station, the charge for telecommunication is lower than the charge at which any other base station offers telecommunication.

Figure 2:
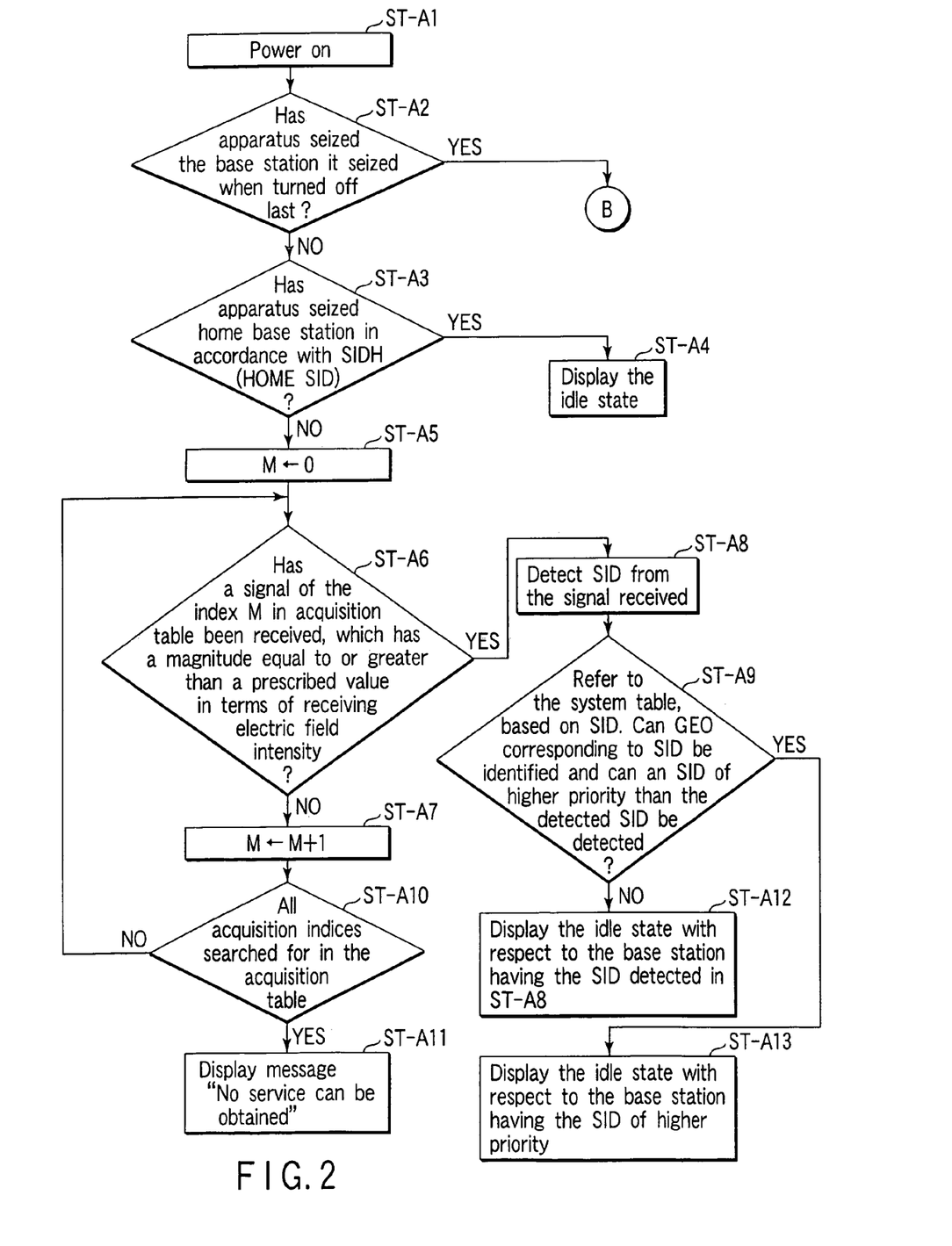
FIG. 2 is a flowchart explaining the control process performed in the apparatus of FIG. 1 until the apparatus comes into an idle state.

FIG. 2 illustrates the control process the controller 40 performing to bring the mobile radio communication apparatus into an idle state. As FIG. 2 shows, the user turns on the apparatus in Step ST-A1. In Step ST-A2, the apparatus tries to seize the last base station to which it was connected when it was turned off last, in accordance with the SID and frequency f, both assigned to the last stored base station and stored in the MRU. The apparatus seizes the last stored base station if two following conditions are satisfied. First, the signal the apparatus receives has the stored frequency f and a magnitude of the received signal with the stored frequency f equal to or greater than a prescribed value. Second, the SID assigned to the last stored base station is detected from the received signal.

In case of the conventional mobile radio communication apparatus if the apparatus seizes the last stored base station, it takes an idle state. Rather in the embodiment, the apparatus tries to seize any other base station that may offer the same service at a lower charge.

If the apparatus fails to seize the base station in Step ST-A2, the process precedes to Step ST-A3. Steps ST-A3 to ST-A13 are a sequence of seizing any other base station that may offer the same service as the service of the last base station at a lower charge.

If NO in Step ST-A2, the process proceeds to Step ST-A3. In Step ST-A3, the apparatus tries to seize the home base station in accordance with the SIDH and the frequency f assigned to the SIDH, both stored in the RAM 44. If the apparatus seizes the home base station, the control process proceeds to Step ST-A4. In Step ST-A4, the display 42 displays the idle states. If the apparatus fails to seize the home base station, the control process proceeds to Step ST-A5 and then to Step ST-A6.

Figure 3:
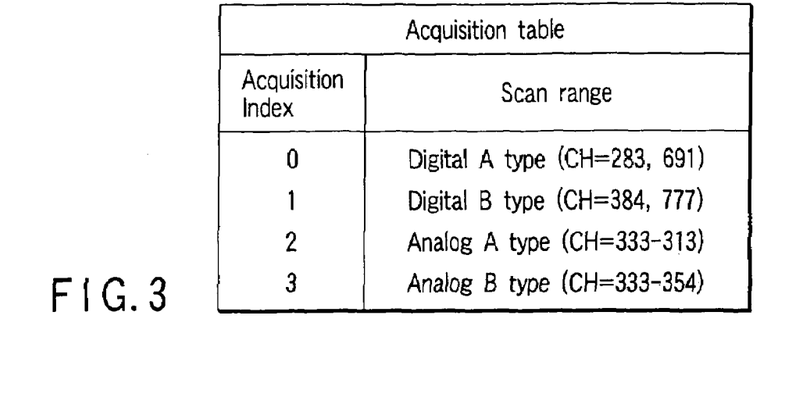
FIG. 3 shows is an acquisition table that is referred to in some steps shown in the flowchart of FIG. 2.

In Steps ST-A5 and ST-A6, the apparatus tries to seize base stations in the order of the acquisition indices described in an acquisition table stored in the RAM 44. As FIG. 3 shows, the acquisition table describes acquisition indices and channel numbers CHs corresponding to the acquisition indices, respectively.

Most mobile radio communication systems installed in the United States are dual systems. In a dual system, a digital system and an analog system are simultaneously in service, so that a mobile radio communication apparatus can be connected to one of the digital system and the analog system. Digital systems are classified into two types. The first type is known as "digital A type," and the second type as "digital B type." Similarly, analog systems are classified into two types, i.e., "analog A type" and "analog B type." In the present embodiment of the invention, four different types of systems can exist in the same geographical area. As indicated above, each base station belongs to a system of one of these four types.

The acquisition indices are associated with priority data items of the above-mentioned four types of the systems. The higher the priority a base station has, the lower the charge at which the base station offers service. Hence, the apparatus tries to seize base stations in the order of the acquisition indices.

In Step ST-A5, the apparatus sets the acquisition index at "0." Then, in Step ST-A6, the apparatus first tries to seize a base station that belongs to the acquisition index 0, i.e., a base station of the digital A type. To allow the apparatus to seize such a base station, the controller 40 sets the receiving frequency for the channel CH283, in accordance with the local signal from the synthesizer 27. The controller 40 then tries to receive a control signal transmitted from the base station over the channel CH283. The controller 40 may fail to receive a control signal having a magnitude equal to or greater than the prescribed value. If so, the controller 40 sets the receiving frequency for the channel CH691 and tries to receive a control signal from the base station over the channel CH691.

If the controller 40 fails to receive the control signal transmitted over the channel CH691, the acquisition index M is increased by one in Step ST-A7. Thus, the index M changes to "1," i.e., a base station of the digital B type. Then the controller 40 tries to receive a control signal transmitted from the base station over the channel CH384, if the controller 40 fails to receive the control signal transmitted over the channel CH384, and then a control signal transmitted from the base station over the channel CH777.

In Step ST-A10, the controller 40 determines whether all acquisition indices have been searched for in the acquisition table. If the controller 40 receives no control signals of the frequencies that correspond to the acquisition indices described in the acquisition table, the control process proceeds to Step ST-A11. In Step ST-A11, the display 42 displays the message of "NO SERVICE CAN BE OBTAINED."

If YES in Step ST-A6, the control process proceeds to Step ST-A8. In Step ST-A8, the SID is detected from the control signal the apparatus has received. Next, the control process goes to Step ST-A9, in which the system table stored in the RAM 44 is referred to.

In the mobile communication system, particularly in the United States, providers are often merged into a big company or purchase other providers to grow. Consequently, the charging system of the same provider may vary in different geographical areas. Thus, in any area other than the area for which the user has entered a contract with a provider, the types of base stations may not always assume the same priority order as indicated by the acquisition indices shown in the acquisition table of FIG. 3. If the mobile radio communication apparatus seizes base stations in accordance with the acquisition table only, the apparatus may be connected to a base station that offers service at relatively high charges in an area other than the contracted area.

Figure 4:
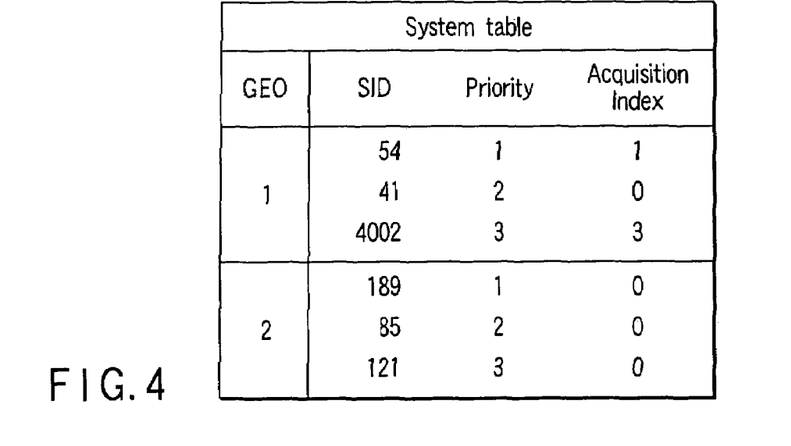
FIG. 4 is a system table that is referred to in some steps shown in the flow chart of FIG. 2.

A system table of the type shown in FIG. 4 has been prepared for two or more geographical areas (GEOs), so that the mobile radio communication apparatus may be connected to a base station that offers service at the lowest charge in each geographical area. The system table of FIG. 4 is applied to the present embodiment.

The system table shows GEOs, the SIDS of the base stations operating in the GEOs, the priorities assigned to the base stations, and the acquisition indices of the base stations.

Referring back to the flowchart of FIG. 2, the apparatus may seize, in Step ST-A6, the base station identified by the acquisition index M described in the acquisition table. If so, the control process goes to Step ST-A8, in which the SID of the base station seized is detected from the control signal. Then, the control process proceeds to Step ST-A9. In Step ST-A9, the system table of FIG. 4 is referred to.

In Step ST-A9, the apparatus tries to seize the base station that has a SID with higher priority than any other base station operating in GEO that pertains to the SID detected in Step ST-A8. Since the acquisition indices correspond to the stored SIDs, the frequency associated with each acquisition index is referred to in the acquisition table and identified. Then, it is determined whether or not the apparatus has received a control signal of the frequency identified. If YES, it is determined whether the SID contained in the control signal is identical to the SID assigned to a base station of higher priority, thereby to seize this base station.

If the SID assigned to the base station with higher priority is detected, the control process proceeds to Step ST-A13. In Step ST-A13, the mobile radio communication apparatus is set into the idle state, and the display 42 displays the idle state.

The mobile radio communication apparatus may fail to seize the base station of the highest priority in accordance with the system table. If so, the apparatus tries to seize the base station that has the second highest priority listed in the system table. If the apparatus fails to seize any base station that has priority higher than the base station with the SID detected in Step ST-A8 operating in the GEO having a base station with the SID detected in Step ST-A8, the control process proceeds to Step ST-A12. In Step ST-A12, the apparatus takes the idle state, after seizing the base station having the SID detected in Step ST-A8.

Namely, even if the priority of the base station that the apparatus should seize in the area into which the apparatus has moved, differs from the priority of the seized base station that is described in the acquisition table, the controller 40 refers to the system table and consequently the apparatus seizes the base station having higher priority of all base stations listed in the system table.

Figure 10:
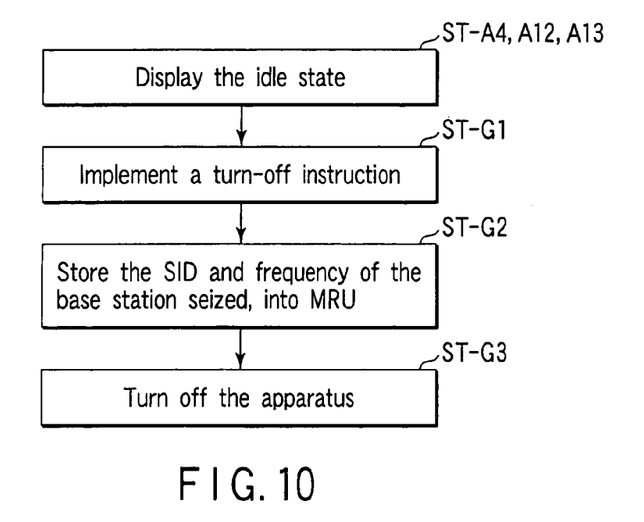
FIG. 10 is a flowchart explaining the control process performed in a conventional mobile radio communication apparatus.

After the apparatus takes an idle state in Step ST-A4, A12 or A13, the user may operate the unit 46 to turn off the apparatus, in Step ST-G1 as is illustrated in FIG. 10. Then, in Step ST-G2, the SID of the base station seized and the frequency f assigned at which the apparatus receives the SID are stored into the MRU region of the RAM 44. Thereafter, the control process is performed, turning off the mobile radio communication apparatus, in step ST-G3.

This control process is of the type hitherto performed. Suppose that the apparatus—fails to seize any base station in Step ST-A9 and the control process may then proceeds to Step ST-A12. Then, the apparatus needs to seize a base station having an SID that is not described in the system table.

This is the case where, as shown in FIG. 11, the mobile radio communication apparatus exists in a shaded part of the service area of the base station B, which does not overlap the service areas of the other base stations A1 to A3. In this case, the system table of FIG. 4 stores SID189, SID85 and SID121 of the base stations A1, A2 and A3, but does not store SID44 of the base station B.

When the user turns off the apparatus in the shaded part of the service area of the base station B, in Step ST-G1, the control process goes to Step ST-G2. In Step ST-G2, SID44 of the base station B now seized and the frequency f assigned at which the apparatus receives SID44 are stored into the MRU region of the RAM 44.

After, the user turned off the apparatus and moved to a position X shown in FIG. 11, bringing the apparatus with the user. When the user turns on the apparatus at the position X, the control process proceeds to Step ST-A1 and A2. Thus, the apparatus tries to seize the base station B having SID44 that is stored in the MRU region of the RAM 44. In this case, a conventional mobile radio communication apparatus seizes only the base station B having SID44 and goes into an idle state, because the position X lies in the service area of the base station B.

It should be noted that the position X lies in the service area of the base station A1 (i.e., home base station) which offers service at a lower charge than that of the base station B. However, the conventional apparatus does not seize the base station A1. Instead, the conventional apparatus seizes the base station B seized in Step ST-A2 when the user turns it off, and then goes into the idle state. That is, the conventional apparatus is connected to the base station B, not to the base station A1 which offers service at a lower charge than that of the base station B.

To solve this problem, the control process is performed in the first embodiment of this invention in a specific manner. That is, whenever an SID is read from the MRU region of the RAM 44, the controller 40 determines whether the apparatus can seize a base station offering service at a lower charge than the base station identified by the SID read from the MRU region. If YES, the apparatus seizes the base station that offers service at the lower charge. How this is achieved will be described, with reference to the flowchart of FIG. 5.

Figure 5:
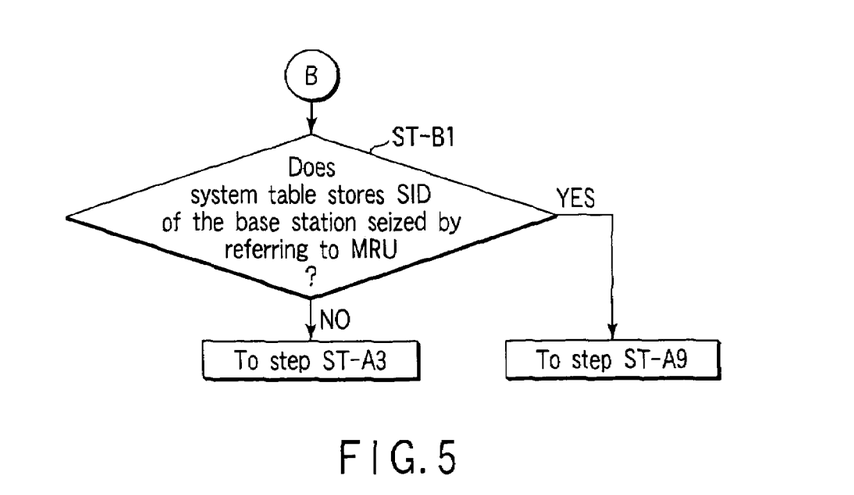
FIG. 5 is a flowchart branching from B shown in FIG. 2.

In Step ST-A2 it may be determined that the apparatus has seized a base station having the SID that has been read from the MRU region of the RAM 44. In this case, the controller 40 determines in Step ST-B1, whether the SID of the base station seized is stored in the system table. If YES, the control process proceeds to Step ST-A9. In Step ST-A9, the controller 40 determines whether the SID of the base station which has higher priority than any other base station operating in the geographical area that pertains to the SID detected in Step ST-A2 corresponding to the last stored SID stored in MRU. If YES, the control process goes to Step ST-A13, in which the apparatus takes the idle state. If NO, or if the SID with higher priority has not been detected or is not stored in system table at Step ST-A9, the control process goes to Step ST-A12. In Step ST-A12, the apparatus is set to the idle state, being connected to the base station with the last stored SID it has seized.

If the SID of the base station seized in accordance with the MRU is not exist in the system table, Step ST-A3 to ST-A13 are performed. Namely, in Step ST-A3, the apparatus tries to detect the SIDH of the highest priority. Then, in Step ST-A5 to ST-A8, the SID of the base station seized is detected from the received control signal. Next, in Step ST-A9, the controller 40 determines whether the SID of higher priority than the SID detected at ST-A8 has been detected from the acquisition table and the system table. If YES in Step ST-A9, the control process goes to Step ST-A13. In NO in Step ST-A9, the control process proceeds to Step ST-A12. In Step ST-A12 or ST-A13, the apparatus takes the idle state.

The apparatus may be turned off in the shaded part of the service area of the base station B shown in FIG. 11. In this case, SID44 of the base station seized is stored into the MRU region of the RAM 44. When the apparatus is turned on after the apparatus has reached the position X shown in FIG. 11, the apparatus tries to seize SID44 in Step ST-A2. In Step ST-B1, it is determined that SID44 is not described in the system table. The control process proceeds to Step ST-A3, in which the apparatus tries to seize the home base station A1 assigned to SID 189. The apparatus seizes the home base station A1 because it exists at the position X included by a service area covered by the home base station A1. Then, the apparatus is set to the idle state, being connected to the base station A1. Thus, the apparatus does not connect to the base station B (SID44) which offers service at a higher charge.

SECOND EMBODIMENT

In the first embodiment the apparatus tries to seize a base station of higher priority if the SID stored in the MRU region is not detected in Step ST-A2. In the second embodiment, the controller periodically checks whether a base station of higher priority may be seized, if YES in Step ST-A2 and the apparatus therefore goes into an idle state.

Figure 6:
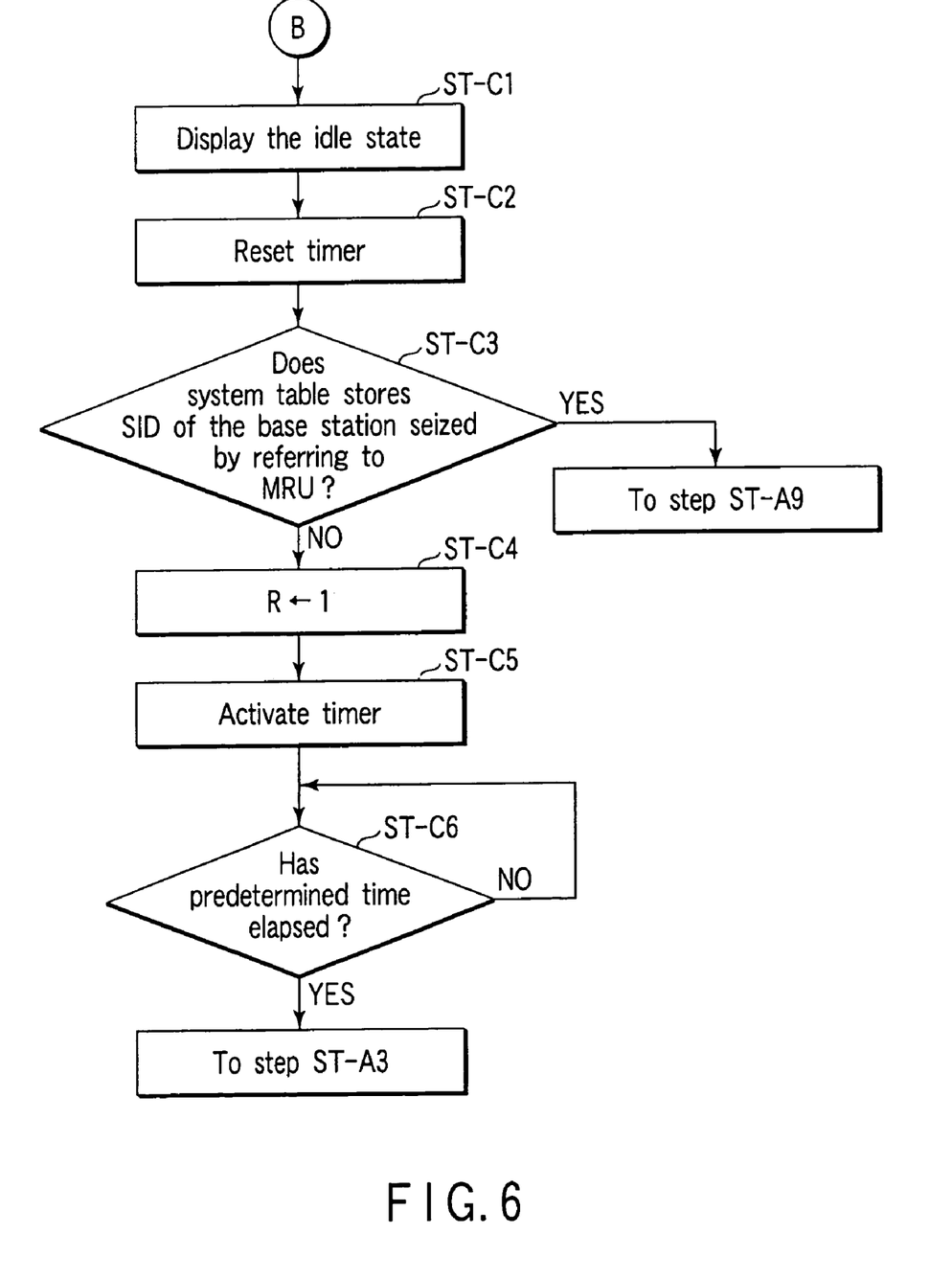
FIG. 6 is a flowchart explaining the control process effected in a second embodiment of the invention and branching from B shown in FIG. 2.

To be more specific, if YES in Step ST-A2, that is, if it is determined that the apparatus has seized the base station that has an SID read from the MRU region, the control process proceeds to Step ST-C1 shown in FIG. 6. In Step ST-C2, the timer incorporated in the apparatus is reset. In Step ST-C3, the controller 40 determines whether the SID read from the MRU region in Step ST-A2 is described in the system table. If YES, the control process goes to Step ST-A9 (FIG. 2).

If NO in Step ST-C3, the control process proceeds to Step ST-C4. In Step ST-C4, "1" is substituted for R, which is indicator for indicating whether the last stored SID of the seized base station is included in system table. Then, in Step ST-C5, the timer is activated. In Step ST-C6, it is determined whether a predetermined time has elapsed from the activation of the timer. If YES, the control process proceeds to Step ST-A3 (FIG. 2). If any SID other than an SID (e.g., SID44 in the case of FIGS. 4 and 11) not described in the system table is found, the control process returns to Step ST-C1 (FIG. 6).

The control process starting at Step ST-A3 is periodically carried out even if the apparatus seizes a base station whose SID is not described in the system table. Hence, the apparatus can seize a base station having higher priority as in the first embodiment.

THIRD EMBODIMENT

The apparatus may be turned off after the apparatus has seized a base station of lower priority whose SID is not described in the system table and may then turned on and seize a base station having SID described in the system table (see FIG. 6). In this case, a geographical area of the seized base station not described in the system table is identified, and the SID of the base station seized again is written into the system table in the third embodiment as will be described with reference to FIG. 7.

Figure 7:
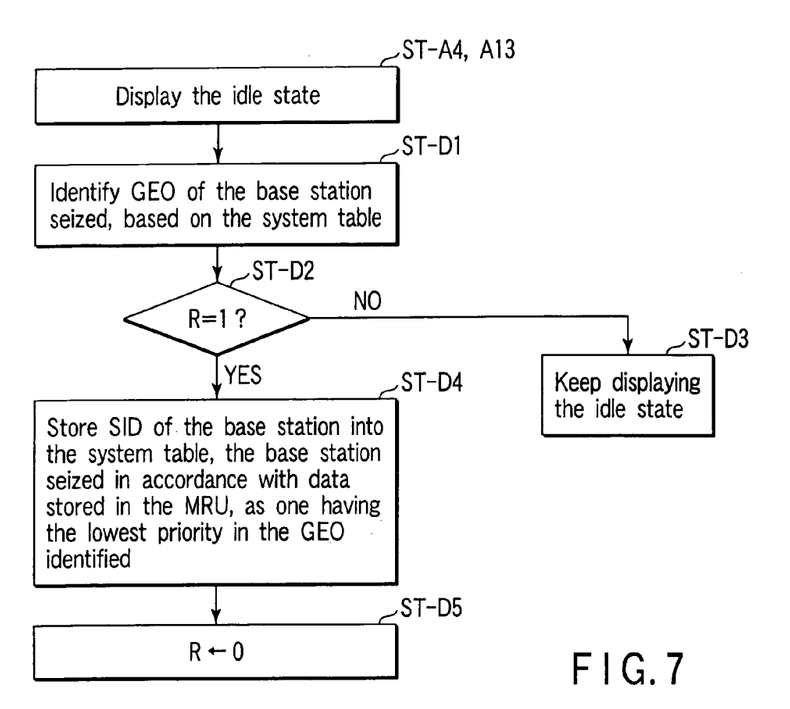
FIG. 7 is a flowchart explaining the control process carried out in a third embodiment of the invention, which follows Step ST-A4 or Step ST-A13 shown in FIG. 2.

Suppose the apparatus seizes a base station whose SID is described in the system table and therefore takes an idle state in Step ST-A4 or ST-A13 (FIG. 2). Then, the control process proceeds to Step ST-D1. In Step ST-D1, a GEO of the base station seized is identified in the system table. In Step ST-D2 the controller determines whether R is "1." That R is "1" means that Steps ST-C3 to ST-C6 have been performed. If YES in Step ST-D2, the process goes to Step ST-D4. In Step ST-D4, the SID of the base station seized, which is stored in the MRU region, is written into the system table. The SID thus written is used as SID that identifies the base station of the lowest priority operating in the GEO identified in Step ST-D 1. Thereafter, the control process proceeds to Step ST-D5, in which R is set at "0." In Step ST-D2 the controller may determine that R is not "1." This means that the apparatus has seized a base station whose SID is described in the system table. In this case, the control process goes to Step ST-D3. In Step ST-D3, nothing is written into the system table, and the apparatus remains in the idle state.

Thus, the chance for an affirmative decision (i.e., "YES") in Steps ST-B1 (FIG. 5) and ST-C3 (FIG. 6) increases. Hence, the chance for an affirmative decision in Step ST-A2 (FIG. 2) increases and it may often unnecessary to carry out the sequence of Steps ST-A3 to ST-A6. Namely, the control process can be simplified in terms of the number of steps. This shortens the time the apparatus requires to seize the base station that offers service at the lowest charge possible.

FOURTH EMBODIMENT

In the third embodiment, if the apparatus is turned off after having seized a base station of lower priority whose SID is not described in the system table and then is turned on and seizes a base station having SID described in the system table, the geographical area of the base station seized last is identified, and the SID of the seized base station not described in the system table is written into the system table. In the fourth embodiment, the SID of the seized base station not described in the system table is not written into the system table. Instead, the controller 40 acquires the SIDs of all base stations operating in the GEO in which the apparatus exists. If any SID not described in the system table is found in the SIDs acquired, this SID not described in the system table is written into the system table. The process control in the fourth embodiment will be described, with reference to FIG. 8.

Figure 8:
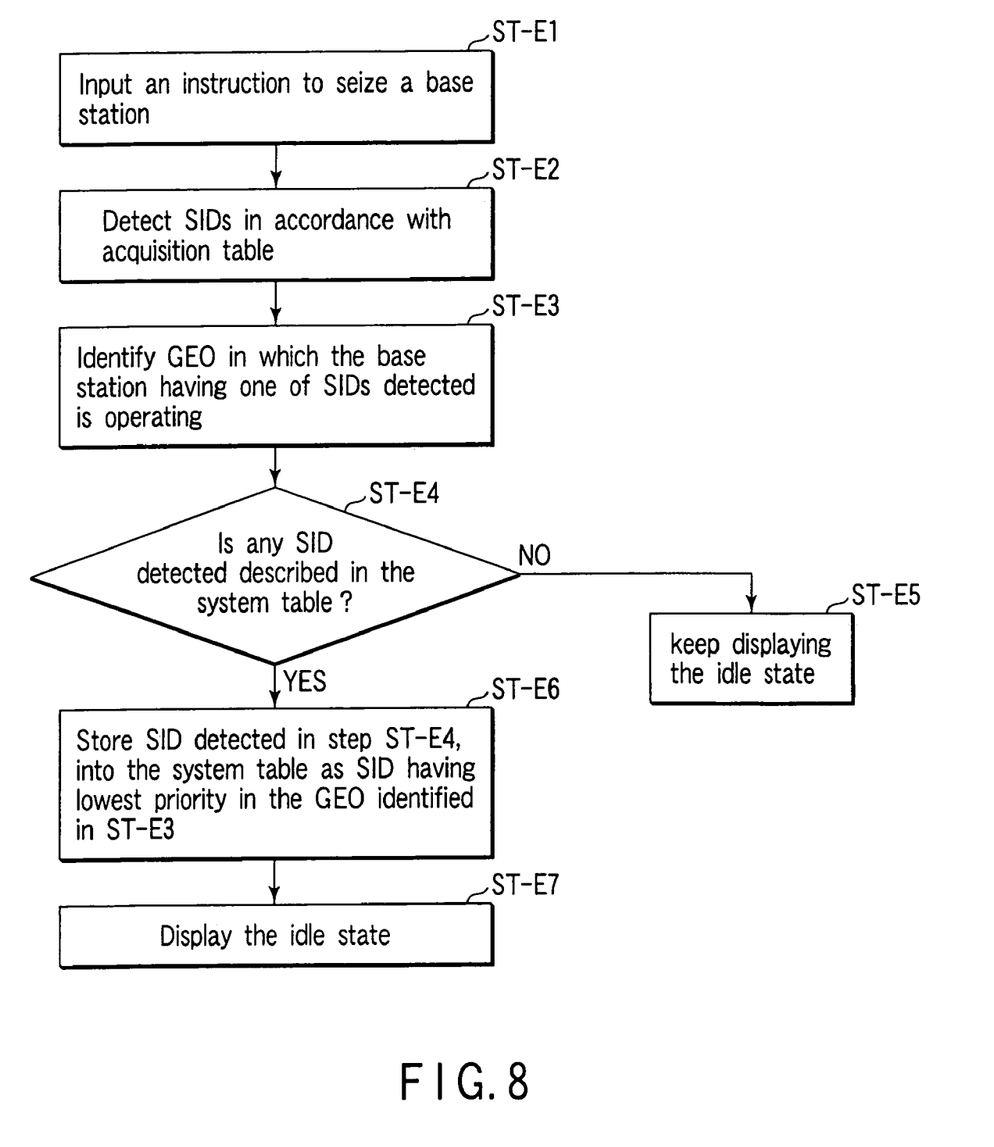
FIG. 8 is a flowchart explaining the control process performed in a fourth embodiment of this invention.

In Step ST-E1, the user inputs an instruction to seize a base station. In Step ST-E2, the apparatus detects SID included in the signals received, in accordance with the acquisition table, in the same way as in the sequence of Steps ST-A5 to ST-A10. In Step ST-E3, a geographical area is identified, in which the base station having one of the SIDs detected is operating. In Step ST-E4, the controller 40 determines whether any one of the SIDS detected is described in the identified geographical area of the system table. If NO, the control process proceeds to Step ST-E5. In Step ST-E5, the apparatus remains in an idle state.

If YES in Step ST-E4, the control process proceeds to Step ST-E6. In Step ST-E6, the SID detected in Step ST-E4 is stored into the system table, as an SID assigned to the base station of the lowest priority. In Step ST-E7, the apparatus goes into an idle state. Thus, SIDs can be written into the system table at any time desired. The decision and the writing of SID, both described above, may be periodically repeated after the apparatus takes an idle state.

FIFTH EMBODIMENT

In the first to fourth embodiments, the SID of any base station seized is unconditionally stored into the MRU region. In the fifth embodiment, the apparatus is turned off, and only if the apparatus has detected an SID not described in the system table, as in the case where the apparatus exists in the shaded part (FIG. 11) of the service area of the base station B, for example. In this case, the SID of a base station seized is not registered in the MRU region.

Figure 9:
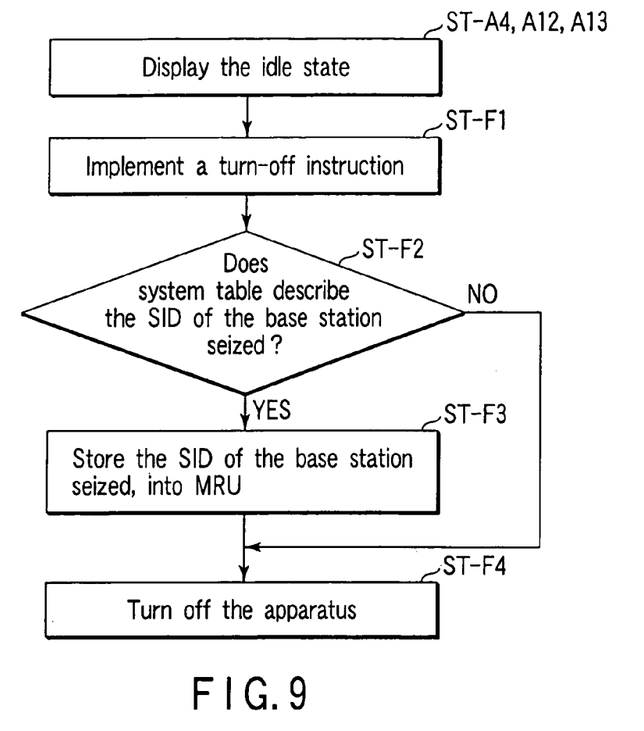
FIG. 9 is a flowchart explaining the control process effected in a fifth embodiment of the present invention.

Assume that if the apparatus detects an SID described in the system table. Then, the sequence of Steps ST-F1 to ST-F3 shown in FIG. 9 is carried out by the apparatus, registering the SID of the base station seized in the MRU region. In Step ST-F4, the apparatus is automatically turned off. When the apparatus is turned on thereafter, the control process returns to Step ST-A1 (FIG. 2).

Thus, the chance for an affirmative decision (i.e., "YES") in Steps ST-B1 (FIG. 5) increases in the fifth embodiment, too. Hence, the fifth embodiment can achieve the same advantage as the fourth embodiment.

As has been described above, the embodiments of the invention can provide a mobile radio communication apparatus that can seize a base station of high priority even if it seized a base station of low priority when it was turned off last and if it now exits in an geographical area included in the low-priority base station and the high-priority base station.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A mobile radio communication apparatus for use in a mobile radio communication system which includes base stations, mobile radio communication apparatuses to be connected to the base stations over radio channels, and in which each of the base stations broadcasts a system ID number for identifying the base station, said apparatus comprising:

first memory means for storing system ID numbers and priority data items, each item associated with each of the system ID numbers and representing priority assigned to each base station, so as to be used to seize one base station;

first seizing means for receiving the broadcast system ID number in accordance with the priority data item stored in said first memory means, for seizing the base station having the system ID number received, and for setting the apparatus in an idle state;

second memory means for storing the system ID number of the seized base station when a user operates the apparatus and inputs a turn-off instruction for turning off the apparatus, while the apparatus remaining the idle state;

third memory means for storing channel numbers in the order of acquisition indices;

second seizing means for receiving a control signal using the stored channel number in accordance with the acquisition indices stored in said third memory means; and control means for turning off the apparatus in response to the turn-off instruction, for determining whether a system ID number that the apparatus receives by referring to the contents of said second memory means is stored in the first memory means, in response to the turn-on instruction, for determining whether the apparatus receives the system ID number of higher priority than the system ID number stored in said second memory means when the received system ID number is stored in the first memory means, for seizing the base station having the system ID number of higher priority than the system ID number stored in said second memory means and setting the apparatus in the idle state when the apparatus receives the system ID number of higher priority, for detecting a system ID number from a received control signal having a received strength equal to or greater than a prescribed value when the received system ID number is not stored in the first memory means, and for seizing the base station having the detected system ID number and setting the apparatus in the idle state when the apparatus receives the detected system ID numbers, wherein said control means operates such that a geographical area into which the apparatus has moved is identified, said first seizing means receives one of the broadcast system ID numbers in accordance with the geographical area identified, and seizes a base station having the one of the system ID number received by said first seizing means and sets the apparatus in the idle state.

2. A mobile radio communication apparatus which is connectable to base stations over radio channels, each of the base stations broadcasting a system ID for identifying the base station, said apparatus comprising:

a first memory for storing a system ID and a frequency of a base station acquired by the apparatus when the apparatus is switched off;

first means for acquiring the acquired base station using the stored frequency when the apparatus is switched on;

a second memory for storing system IDs with priority, the priority being assigned to each base station;

first means for determining whether the system ID of the acquired base station is stored in the second memory;

a third memory for storing system ID and a frequency of a home base station;

second means for acquiring the home base station using the frequency stored in the third memory when the system ID of the acquired base station is not stored in the second memory;

a fourth memory for storing frequencies in the order of acquisition indices;

means for receiving a control signal using the frequencies stored in the fourth memory in accordance with the stored acquisition indices when the apparatus does not acquire the home base station;

means for obtaining a system ID from the received control signal of which received strength is greater than a prescribed value;

second means for determining whether a system ID associated with a priority higher than that of the obtained system ID is stored in the second memory; and third means for acquiring a base station of a system ID associated with the higher priority when the system ID associated with the higher priority is stored in the second memory.

3. The apparatus according to claim 2, the first memory stores the system ID of the base station acquired by the apparatus when the apparatus is switched off when the system ID is stored in the second memory.

4. The apparatus according to claim 2, wherein the system ID stored in said second memory is written into said first memory if the system ID is not stored in said first memory.

5. The apparatus according to claim 2, further comprising receiving means for receiving the broadcast system ID and writing the received system ID into said first memory when the received broadcast system ID is different from any one of the system IDs stored in said first memory.

6. The apparatus according to claim 2, further comprising:

first memory means for storing system IDs and priority data items, each item associated with each of the system IDs and representing priority assigned to each base station, so as to be used to seize one base station;

first seizing means for receiving the broadcast system ID in accordance with the priority data item stored in said first memory means, for seizing the base station having the system ID received, and for setting the apparatus in an idle state;

second memory means for storing the system ID of the seized base station when a user operates the apparatus and inputs a turn-off instruction for turning off the apparatus, while the apparatus remaining in the idle state;

second seizing means for seizing the base station having the system ID stored in said second memory means and setting the apparatus in an idle state when the apparatus is turned on; and control means for determining whether the apparatus receives a system ID of higher priority than the system ID of the base station seized by said second seizing means, by referring to the contents of said first memory means, and for seizing the base station having the system ID of higher priority and setting the apparatus in the idle state when the apparatus receives the system ID of higher priority.

7. Method in a mobile radio communication apparatus for acquiring a base station in a mobile radio communication system in which each base station broadcasts a system ID for identifying the base station, said method comprising:

storing in a first memory a system ID and a frequency of a base station acquired by the apparatus when the apparatus is switched off;

acquiring the acquired base station using the stored frequency when the apparatus is switched on;

storing system IDs with priority in a second memory, the priority being assigned to each base station;

determining whether the system ID of the acquired base station is stored in the second memory;

storing system ID and a frequency of a home base station in a third memory;

acquiring the home base station using the frequency stored in the third memory when the system ID of the acquired base station is not stored in the second memory;

storing frequencies in the order of acquisition indices in a fourth memory;

receiving a control signal using the frequencies stored in the fourth memory in accordance with the stored acquisition indices when the apparatus does not acquire the home base station;

obtaining a system ID from the received control signal of which received strength is greater than a prescribed value;

determining whether a system ID associated with a priority higher than that of the obtained system ID is stored in the second memory; and acquiring a base station of a system ID associated with the higher priority when the system ID associated with the higher priority is stored in the second memory.

8. The method according to claim 7, further comprising:

determining whether the system ID of the base station acquired by the apparatus when the apparatus is switched off when the system ID is stored in the second memory; and storing in the first memory the system ID of the acquired base station when the system ID is stored in the second memory.

9. A mobile radio communication apparatus for use in a mobile radio communication system which includes base stations, mobile radio communication apparatuses to be connected to the base stations over radio channels, and in which each of the base stations broadcasts a system ID number for identifying the base station, said apparatus comprising:

a first memory configured to store system ID numbers and priority data items, each item associated with each of the system ID numbers and representing priority assigned to each base station, so as to be used to seize one base station;

a first seizing unit configured to receive the broadcast system ID number in accordance with the priority data item stored in said first memory, to seize the base station having the system ID number received, and to set the apparatus in an idle state;

a second memory configured to store the system ID number of the seized base station when a user operates the apparatus and inputs a turn-off instruction for turning off the apparatus, while the apparatus remaining the idle state;

a third memory configured to store channel numbers in the order of acquisition indices;

a second seizing unit configured to receive a control signal using the stored channel number in accordance with the acquisition indices stored in said third memory; and a control unit configured to turn off the apparatus in response to the turn-off instruction, configured to determine whether a system ID number that the apparatus receives by referring to the contents of said second memory is stored in the first memory, in response to the turn-on instruction, configured to determine whether the apparatus receives the system ID number of higher priority than the system ID number stored in said second memory when the received system ID number is stored in the first memory, configured to seize the base station having the system ID number of higher priority than the system ID number stored in said second memory and to set the apparatus in the idle state when the apparatus receives the system ID number of higher priority, configured to detect a system ID number from a received control signal having a received strength equal to or greater than a prescribed value when the received system ID number is not stored in the first memory, and configured to seize the base station having the detected system ID number and to set the apparatus in the idle state when the apparatus receives the detected system ID numbers, wherein said control unit operates such that a geographical area into which the apparatus has moved is identified, said first seizing unit receives one of the broadcast system ID numbers in accordance with the geographical area identified, and seizes a base station having the one of the system ID number received by said first seizing unit and sets the apparatus in the idle state.

10. A mobile radio communication apparatus which is connectable to base stations over radio channels, each of the base stations broadcasting a system ID for identifying the base station, said apparatus comprising:

a first memory configured to store a system ID and a frequency of a base station acquired by the apparatus when the apparatus is switched off;

a first acquiring unit configured to acquire the acquired base station using the stored frequency when the apparatus is switched on;

a second memory configured to store system IDs with priority, the priority being assigned to each base station;

a first determining unit configured to determine whether the system ID of the acquired base station is stored in the second memory;

a third memory configured to store a system ID and a frequency of a home base station;

a second acquiring unit configured to acquire the home base station using the frequency stored in the third memory when the system ID of the acquired base station is not stored in the second memory;

a fourth memory configured to store frequencies in the order of acquisition indices;

a receiving unit configured to receive a control signal using the frequencies stored in the fourth memory in accordance with the stored acquisition indices when the apparatus does not acquire the home base station;

an obtaining unit configured to obtain a system ID from the received control signal of which received strength is greater than a prescribed value;

a second determining unit configured to determine whether a system ID associated with a priority higher than that of the obtained system ID is stored in the second memory; and a third acquiring unit configured to acquire a base station of a system ID associated with the higher priority when the system ID associated with the higher priority is stored in the second memory.

11. The apparatus according to claim 10, wherein the first memory stores the system ID of the base station acquired by the apparatus when the apparatus is switched off when the system ID is stored in the second memory.

12. The apparatus according to claim 10, wherein the system ID stored in said second memory is written into said first memory if the system ID is not stored in said first memory.

13. The apparatus according to claim 10, further comprising a receiving unit configured to receive the broadcast system ID, and a writing unit configured to write the received system ID into said first memory when the received broadcast system ID is different from any one of the system IDs stored in said first memory.

14. The apparatus according to claim 10, further comprising:

a fifth memory configured to store system IDs and priority data items, each item associated with each of the system IDs and representing priority assigned to each base station, so as to be used to seize one base station;

a first seizing unit configured to receive the broadcast system ID in accordance with the priority data item stored in said fifth memory, to seize the base station having the system ID received, and to set the apparatus in an idle state;

a sixth memory configured to store the system ID of the seized base station when a user operates the apparatus and inputs a turn-off instruction for turning off the apparatus, while the apparatus remaining in the idle state;

a second seizing unit configured to seize the base station having the system ID stored in said sixth memory and to set the apparatus in an idle state when the apparatus is turned on; and a control unit configured to determine whether the apparatus receives a system ID of higher priority than the system ID of the base station seized by said second seizing unit, by referring to the contents of said fifth memory, and to seize the base station having the system ID of higher priority and set the apparatus in the idle state when the apparatus receives the system ID of higher priority.

* * * * *